United States Patent
Yamagishi et al.

(10) Patent No.: US 9,806,572 B2
(45) Date of Patent: Oct. 31, 2017

(54) ROTOR FOR ROTARY ELECTRIC MACHINE AND ROTARY ELECTRIC MACHINE

(71) Applicants: TOYOTA JIDOSHA KABUSHIKI KAISHA, Toyota-shi, Aichi-ken (JP); AISIN AW CO., LTD., Anjo-shi, Aichi-ken (JP); AISIN SEIKI KABUSHIKI KAISHA, Kariya-shi, Aichi-ken (JP)

(72) Inventors: Yoshitada Yamagishi, Okazaki (JP); Yu Hirai, Toyota (JP); Tatsuhiko Mizutani, Toyota (JP); Masashi Matsumoto, Nagoya (JP); Takashi Matsumoto, Toyota (JP); Shinya Sano, Toyota (JP); Taketo Takeuchi, Nishio (JP); Akifumi Kurokawa, Kariya (JP)

(73) Assignees: TOYOTA JIDOSHA KABUSHIKI KAISHA, Toyota-shi, Aichi-ken (JP); AISIN AW CO., LTD., Anjo-shi, Aichi-ken (JP); AISIN SEIKI KABUSHIKI KAISHA, Toyota-shi, Aichi-ken (JP)

( * ) Notice: Subject to any disclaimer, the term of this patent is extended or adjusted under 35 U.S.C. 154(b) by 216 days.

(21) Appl. No.: 14/772,217

(22) PCT Filed: Mar. 7, 2014

(86) PCT No.: PCT/IB2014/000258
§ 371 (c)(1),
(2) Date: Sep. 2, 2015

(87) PCT Pub. No.: WO2014/140709
PCT Pub. Date: Sep. 18, 2014

(65) Prior Publication Data
US 2016/0036276 A1    Feb. 4, 2016

(30) Foreign Application Priority Data

Mar. 11, 2013  (JP) ................................ 2013-048256

(51) Int. Cl.
*H02K 9/00* (2006.01)
*H02K 1/32* (2006.01)
(Continued)

(52) U.S. Cl.
CPC ................ *H02K 1/32* (2013.01); *H02K 1/22* (2013.01); *H02K 9/19* (2013.01); *H02K 1/2766* (2013.01)

(58) Field of Classification Search
CPC .. H02K 1/32; H02K 1/20; H02K 9/19; H02K 5/20; H02K 3/24; H02K 9/12
(Continued)

(56) References Cited

U.S. PATENT DOCUMENTS 4,365,178 A * 12/1982 Lenz ...................... H02K 1/32
310/216.053
6,091,168 A *  7/2000 Halsey .................... H02K 1/24
310/166
(Continued)

FOREIGN PATENT DOCUMENTS

JP    2006-067777 A    3/2006
JP    2008-228522 A    9/2008
(Continued)

*Primary Examiner* — Thanh Lam
(74) *Attorney, Agent, or Firm* — Sughrue Mion, PLLC

(57) ABSTRACT

A rotor 14 includes a shaft having a coolant flow passage and a coolant supply port, a rotor core 24 fixed on the shaft and formed of laminated steel plates, and a magnet set 32 provided in the rotor core 24 to extend along an axial direction thereof. The rotor core 24 has a first flow passage 34 provided near the magnet to extend therealong and a second flow passage 36 that connects the coolant supply port 28 of the shaft 22 and the first flow passage 34, thereby
(Continued)

constituting a coolant flow path. The second flow passage 36 is formed by overlapping second slits 37 formed in the respective steel plates at an axially intermediate region A of the rotor core 24, the formed position of the second slit 37 being different for each steel plate combined. The first flow passage 34 and the second flow passage 36 join at the axially intermediate region A of the rotor core 24.

4 Claims, 5 Drawing Sheets

(51) Int. Cl.
    *H02K 1/22*     (2006.01)
    *H02K 9/19*     (2006.01)
    *H02K 1/27*     (2006.01)

(58) Field of Classification Search
    USPC .................. 310/52–59, 61, 156.01–156.83
    See application file for complete search history.

(56) References Cited

U.S. PATENT DOCUMENTS

| | | | |
|---|---|---|---|
| 6,943,469 B2* | 9/2005 | Nelson | H02K 9/06 310/52 |
| 8,686,607 B2* | 4/2014 | Elender | H02K 1/32 310/52 |
| 2013/0020889 A1 | 1/2013 | Yamamoto et al. | |
| 2015/0048699 A1* | 2/2015 | Ribarov | H02K 1/32 310/54 |

FOREIGN PATENT DOCUMENTS

| | | |
|---|---|---|
| JP | 2008-312343 A | 12/2008 |
| JP | 2009-055737 A | 3/2009 |
| JP | 2010-263757 A | 11/2010 |
| WO | 2013/011782 A1 | 1/2013 |
| WO | 2014/140709 A2 | 9/2014 |

* cited by examiner

ROTOR FOR ROTARY ELECTRIC MACHINE AND ROTARY ELECTRIC MACHINE

BACKGROUND OF THE INVENTION

1. Field of the Invention

The present invention relates to a rotor for a rotary electric machine and in particular to a rotor that includes a rotor core in which a magnet is provided.

2. Description of Related Art

It is being in practice that a magnet-embedded rotor of a rotary electric machine is cooled by using a coolant such as a cooling oil.

For example, Japanese Patent Application Publication No. 2008-228522 (JP 2008-228522 A) discloses a rotor of a rotary electric machine that is formed with a coolant flow path extending through a magnet-provided rotor core from its inner periphery to outer periphery, the core being formed by combining or laminating steel plates each of which is formed with a slit.

In addition, Japanese Patent Application Publication No. 2006-67777 (JP 2006-67777 A) discloses a cooling structure of a rotary electric machine that is formed with a coolant flow path extending through a rotor core from its inner periphery to outer periphery, the core being formed by laminating steel plates each of which is formed with a slit that extends outward in a radial direction form a shaft hole formed at a central portion of the core to an outer circumferential portion.

Furthermore, Japanese Patent Application Publication No. 2008-312343 (JP 2008-312343 A) discloses a motor device with a magnet cooling structure in which a coolant received from a shaft at an axially central portion of a rotor core is guided toward magnets and then is caused to flow to opposite ends of the rotor core in order to cool the magnets in the rotor core.

Still more, Japanese Patent Application Publication No. 2010-263757 (JP 2010-263757 A) discloses a coolant flow path in a cage-type induction machine, though this is not intended to cool magnets provided in a rotor core, which extends through the rotor core from its inner periphery to outer periphery, the core being formed by combining or laminating steel plates each of which is formed with a slit.

Magnets, which are provided in a rotor core to extend along an axial direction of the rotor core, are apt to have a high temperature due to a heat accumulation at an axially central portion of the rotor core. Thus, for suppressing the generation of, irreversible thermal demagnetization caused by high temperature, it is desirable to cool an axially central portion of each magnet with a high priority. For this purpose, in the rotor core that is formed by laminating electromagnetic steel plates in an axial direction, if a coolant flow path, which guides in the rotor core a coolant from the shaft toward the magnets, is formed by elongated slits in a radial direction, the centrifugal force during rotation of the rotor increases the resulting stress applied to the slit-formed portion of the electromagnetic steel plates, which may cause the strength of the electromagnetic steel plates to reduce.

SUMMARY OF THE INVENTION

The present invention provides a rotary electric machine as well as a rotor for use in the rotary electric machine that is capable of supplying a coolant at a lower temperature to cool a portion of a magnet which apts to have a high temperature without causing the slit-formed steel plates to degrade in strength.

A rotor for a rotary electric machine according to the present invention includes a rotor core, a shaft having therein a coolant flow passage and a coolant supply port, and a magnet provided in the rotor core and extending along an axial direction of the rotor core. The coolant flow passage allows a coolant to flow, the coolant supply port supplies the coolant outside. The rotor core is fixedly mounted on the shaft and formed by laminating steel plates. The rotor core has a coolant flow path through which the coolant flows. The coolant flow path includes a first flow passage and a second flow passage. The first flow passage extends along the axial direction near the magnet. The second flow passage connects the coolant supply port of the shaft and the first flow passage. The first flow passage is formed to penetrate the rotor core by overlapping first slits formed in all of the respective steel plates that constitute the rotor core. The second flow passage is formed by overlapping second slits formed in the steel plates that constitute an axially intermediate region of the rotor core and is formed by combining the steel plates which are formed with respective slits whose formation positions are different. The first flow passage and the second flow passage join at the axially intermediate region of the rotor core.

In the rotor for a rotary electric machine according to the present invention, a circumferential width of the first flow passage may be set to be larger than a circumferential width of the second flow passage, and the second slit formed in the steel plate that is provided with a junction at which the first flow passage and the second flow passage join may be shaped to spread in a radially outward direction for connection with the first slit that constitutes the first flow passage.

In addition, in the rotor for a rotary electric machine according to the present invention, the second flow passage may be bifurcated toward the first flow passage and may have a radially symmetrical shape.

Furthermore, in the rotor for a rotary electric machine according to the present invention, with respect to the second slit that sets the second flow passage, an inner diameter side slit portion may be set to be shorter than an intermediate slit portion. In the inner diameter side slit portion, one radial end may be opened to a shaft hole of the rotor core and the other radial end may be closed. In the intermediate slit portion, both radial ends may be closed.

A rotary electric machine according to another aspect of the present invention includes a rotor that has any one of the above configurations and a stator that is faced to the rotor with a gap.

The rotor for a rotary electric machine according to the present invention and the rotary electric machine according to the present invention make it possible to cool a high temperature portion of the magnet by supplying the cooling oil of a lower temperature, while suppressing the decrease of the strength of the steel plates despite of formation of the slit.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the present invention (hereinafter referred to as "embodiment") will be described in detail with reference to the drawings. In this description, specific shapes, raw materials, numerals, directions and other factors are mere exemplary for the purpose of easy understanding the present invention and may be properly changed or varied whenever necessary depending on for example, a use, an object, or design specification. In addition, in light of plural embodiments or modifications involved in the following description, combining features of the embodiments or modifications properly is within an original scope of expectation.

Figure 1:
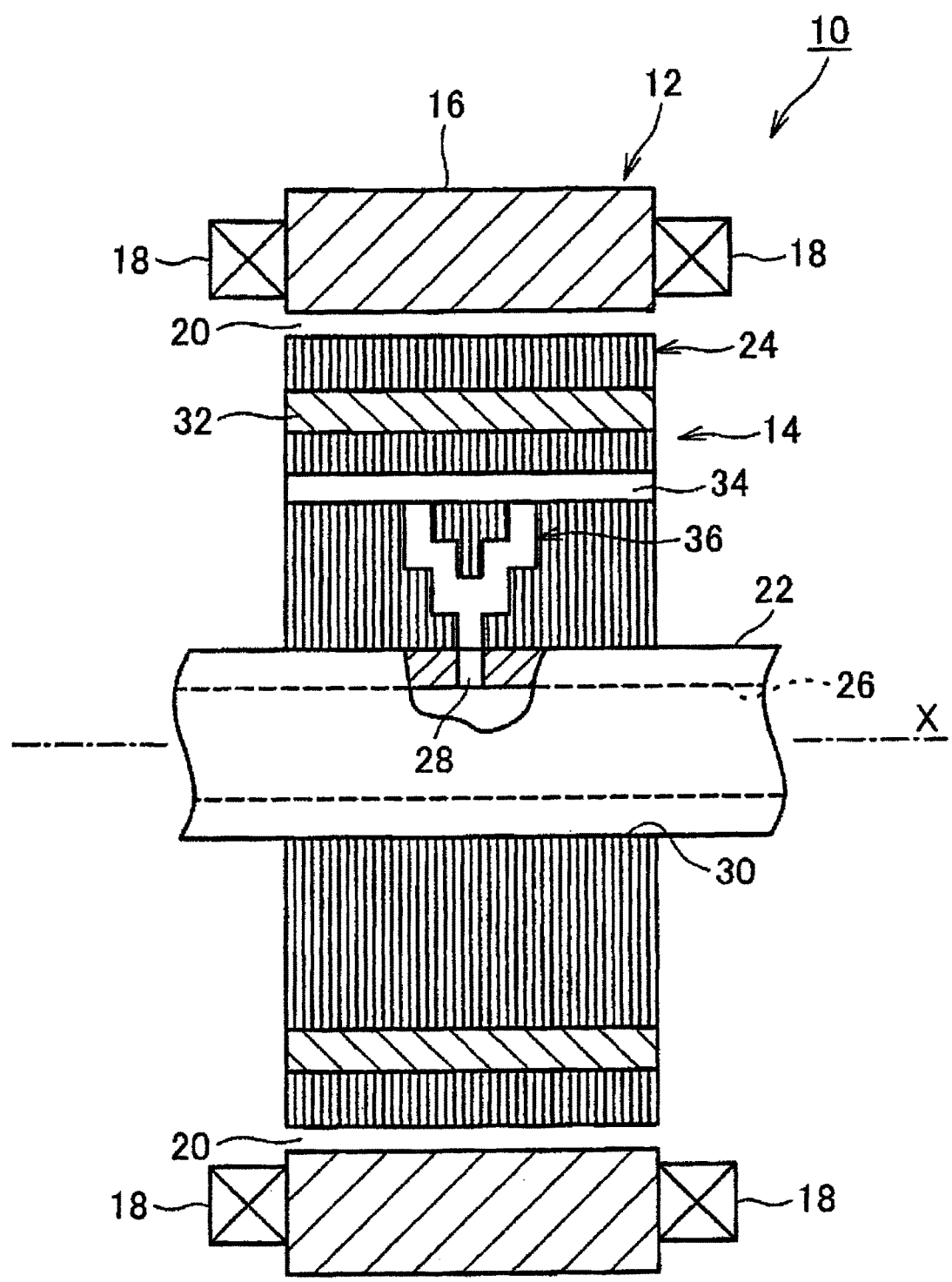
FIG. 1 is a cross-sectional view of a rotary electric machine taken along its axial direction according to an embodiment of the present invention.

FIG. 1 is a cross-sectional view of a rotary electric machine 10 taken along its axial direction according to an embodiment of the present invention. The rotary electric machine 10 includes a stator 12 and a rotor 14. The stator 12 is also called stationary member. In addition, the rotor 14 is also said to be rotating member.

The stator 12 has a cylindrical stator core 16 that is formed, for example, by laminating punched electromagnetic steel plates in an axial direction each of which is of a substantially ring shape and a coil 18 that is wound around a plurality of circumferentially equi-spaced teeth that are so formed inside the cylindrical stator core 16 to project, for example. When the coil 18 is supplied with, for example, an AC voltage from outside the rotary electric machine 10, a rotating magnetic field is formed inside the stator 12.

The rotor 14 is arranged inside the stator 12 with a gap 20. The rotor 14 includes a shaft 22 that is supported by bearing members (not shown) to rotate and a rotor core 24 that is fixedly mounted on an outer periphery of the shaft 22. The rotor 14 is constructed to rotate by its attraction/repulsion action relative to the rotating magnetic field generated inside the stator 12.

Inside the shaft 22, there is formed a coolant flow passage 26 through which a coolant such as (for example) a cooling oil flows. In FIG. 1, a rotation center axis X of the shaft 22 is shown. The coolant flow passage 26 is so formed as to extend along the rotation center axis X of the shaft 22. In addition, the shaft 22 is formed with a coolant supply port 28 that supplies the cooling oil from the coolant flow passage 26 inside the shaft 22 to the rotor core 24.

Here, the direction along the rotation center axis X of the shaft 22 corresponds to an axial direction of each of the stator 12 and the rotor 14. In addition, a radial direction centered at the rotation center axis X of the shaft 22 corresponds to a radial direction of each of the stator 12 and the rotor 14. Such relationships remain unchanged throughout the present specification and claims.

In the following explanation, the cooling oil is described as the coolant, but is not limited thereto. As the coolant, a liquid, other than the cooling oil such as a cooling water or a gas such as an air may be employed.

The rotor core 24 has, for example, a cylindrical outer profile. The rotor core 24 formed, for example, by laminating punched electromagnetic steel plates each of which is of a ring shape in the axial direction. The rotor core 24 is formed at its central portion with a shaft hole 30 that passes through the rotor core 24 in the axial direction. The rotor core 24 is fixed to the shaft 22 by riveting, press-fit, interference-fit (shrinkage-fit), welding, screwing or other fixing technique while the shaft 22 is being held in the shaft hole 30.

Figure 3A:
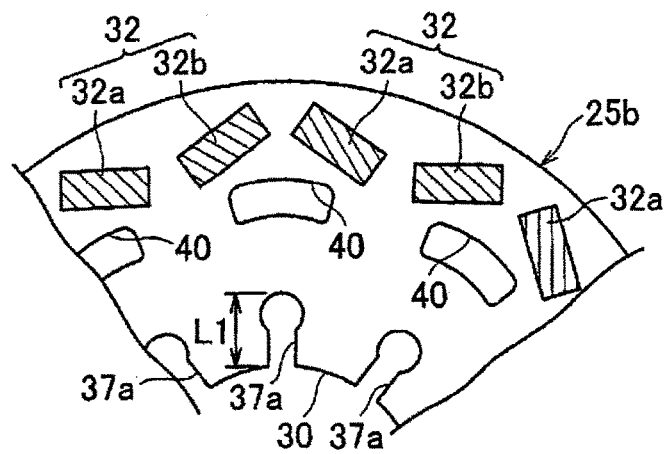
FIG. 3A is a plane view of an inner diameter side slit portion of a slit configuration formed in each electromagnetic steel pate to constitute the coolant flow path illustrated in FIG. 2.
Figure 3B:
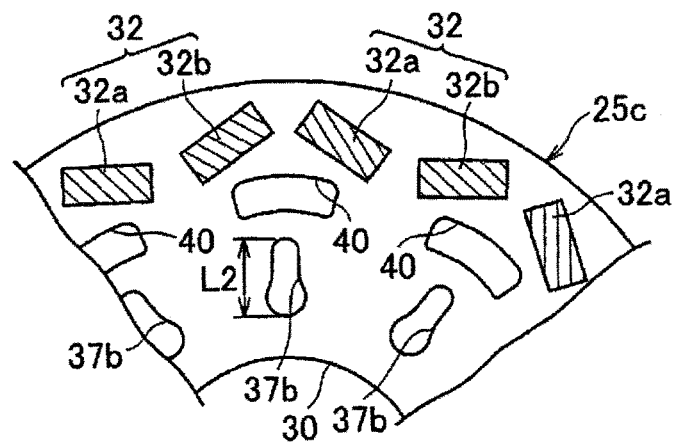
FIG. 3B is a plane view of an intermediate slit portion of the slit configuration formed in each electromagnetic steel pate to constitute the coolant flow path illustrated in FIG. 2.
Figure 3C:
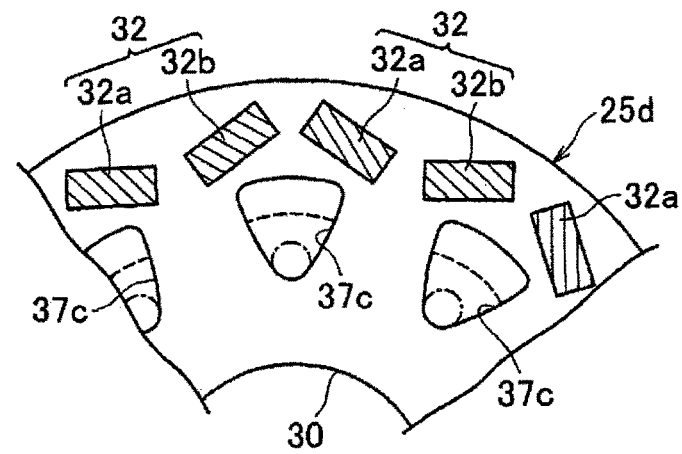
FIG. 3C is a plane view of an outer diameter side slit portion of the slit configuration formed in each electromagnetic steel pate to constitute the coolant flow path illustrated in FIG. 2.

Magnet sets 32 are so embedded in the rotor core 24 as to be near the outer periphery thereof. Each magnet set 32 whose length is almost the same as the length of the rotor core 24 is so provided in the rotor core 24 as to extend along the axial length thereof. In addition, as illustrated in FIGS. 3A-3C, each of the magnet sets 32 that is provided in the rotor core 24 to constitute a plurality of circumferentially equi-spaced magnetic poles is constituted of a pair of magnets 32a and 32b that are arranged such that both the magnets 32a and 32b constitute a substantial V-shaped structure spreading toward the outer periphery of the rotor core 24. It is to be noted that the number of the magnets in each of the magnetic poles is not limited to two and therefore each magnet pole can consist of one or more than two magnets.

A coolant flow path is provided in the rotor core 24 through which the cooling oil flows and includes a first flow passage 34 that extends along the magnet set 32 in parallel to the axial direction near a radially inward direction of the rotor core 24 and a second flow passage 36 that connects the coolant supply port 28 of the shaft 22 and the first flow passage 34. The first flow passage 34 and the second flow passage 36 are formed to join together at an axially intermediate region A (see FIG. 2) of the rotor core 24. Next, with reference to FIG. 2 and FIGS. 3A-3C, the first flow passage 34 and the second flow passage 36 of the rotor core 24 will be described in great detail.

Figure 2:
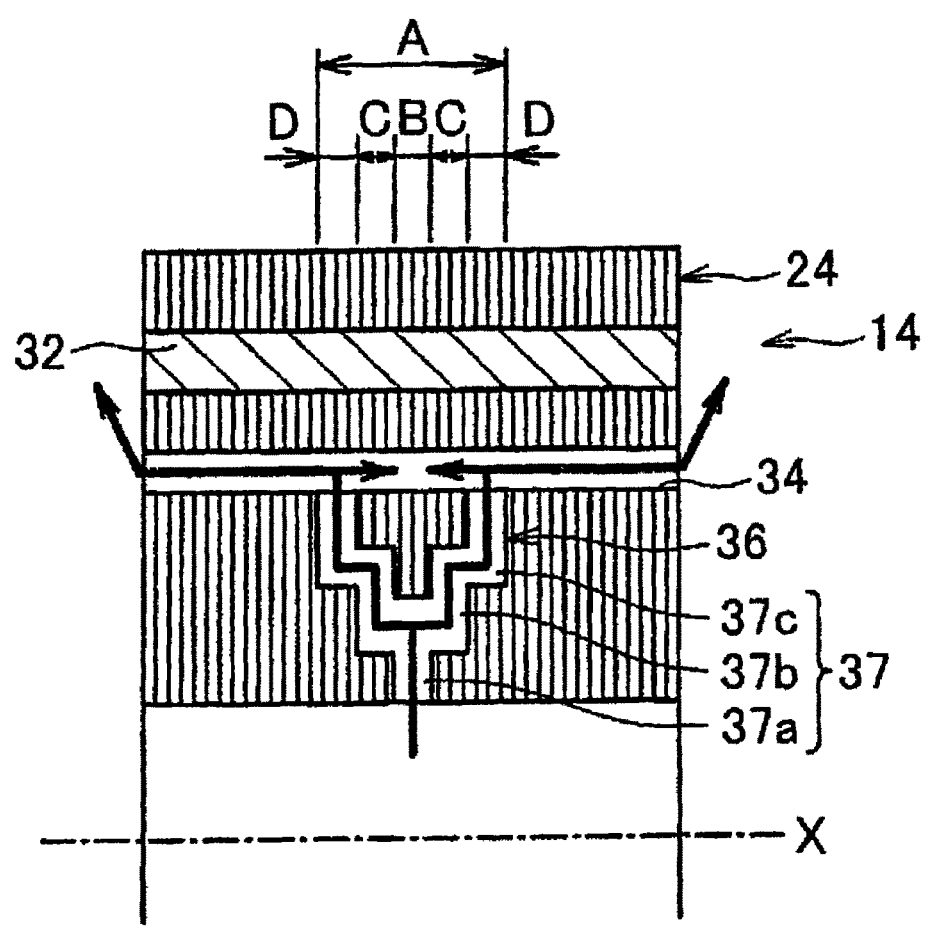
FIG. 2 is an enlarged view of a coolant flow path formed in a rotor core illustrated in FIG. 1.

FIG. 2 is an enlarged view of the coolant flow path that includes the first flow passage 34 and the second flow passage 36 and that is formed in the rotor core 24 in FIG. 1. In FIG. 2, a radially upper half portion of the rotor core 24 is enlarged and illustrating the shaft 22 is omitted. In addition, FIGS. 3A to 3C are plane views of slit shapes formed in the electromagnetic steel plates and indicate an inner diameter side slit portion, an intermediate slit portion, and an outer diameter slit portion, respectively.

As shown in FIGS. 2 and 3A-3C, the first flow passage 34 formed to penetrate the rotor core 24 in the axial direction thereof by overlapping first slits 40 formed in all of the respective electromagnetic steel plates that constitute the rotor core 24. In this embodiment, each of the first slits 40 in the rotor 14 is located to face a circumferential intermediate region of the corresponding magnetic pole. In detail, regarding the circumferentially adjacent two magnetic poles each of which includes a pair of the magnets 32a and 32b, the first slit 40 is formed to locate at a radially inward direction and a portion between the magnet 32a of one magnet pole and the magnet 32b of the other magnet pole. The first slit 40 has, for example, a substantially arc-shaped open-slot whose circumferential opposite ends are closest to the magnets 32a and 32b.

The second flow passage 36 of the rotor core 24 is formed by overlapping second slits 37 formed in the electromagnetic steel plates that constitute an axially intermediate region A of the rotor core 24. In addition, the formation of the second flow passage 36 is achieved by combining the electromagnetic steel plates that have different portions for formation of the second slit 37.

The second slits 37 that constitute the second flow passage 36 each include an inner diameter side slit portion 37a that is an innermost diameter side facing the shaft hole 30, an intermediate slit portion 37b that is so located at a radially intermediate position as to be in fluid communication with a radially outward direction of the inner diameter side slit portion 37a, and an outer diameter side slit portion 37c that is so located at a radially outward direction as to be in fluid communication with the intermediate slit portion 37b and the first slit 40.

More specifically, as shown in FIGS. 2 and 3A, the inner diameter side slit portion 37a of the second slit 37 is formed in each of the electromagnetic steel plates 25b that constitute a central portion B that is in the form of a further centralized portion of the axially intermediate region A of the rotor core 24. In this embodiment, the inner diameter side slit portion 37a is configured to open at its radially inward end portion to the shaft hole 30, to extend through a length L1 in the radial direction, and to have a substantially circular shape at its radially outward end portion.

In such a structure, it is desired to make the radial length L1 of the inner diameter side slit portion 37a shorter than a radial length L2 of the intermediate slit portion 37b as will be described below. The reason is that the larger the radial length of the inner diameter side slit portion 37a whose inner diameter end portion is formed in the opened structure, the larger the stress applied to near the radially outward end portion of the inner diameter side slit portion 37a, by centrifugal force during rotation of the rotor, which decrease the strength of the electromagnetic steel plates 25b and thereby the strength of the rotor core 24.

As shown in FIGS. 2 and 3B, the intermediate slit portion 37b of the second slit 37 is formed in each of the electromagnetic steel plates 25c that constitute a region C which adjoins each axial end side of the central portion B within the axially intermediate region A of the rotor core 24. The intermediate slit portion 37b extends in the radial direction through a length L2 and whose opposite end portions are closed. In addition, the intermediate slit portion 37b in this embodiment is formed such that whose radially inward end side is of a substantially circular shape corresponding to the inner diameter side slit portion 37a.

As shown in FIGS. 2 and 3C, an outer diameter side slit portion 37c of the second slit 37 is formed in each of the electromagnetic steel plates 25d that constitute a region D which adjoins each axially outer side end of the region B within the axially intermediate region A of the rotor core 24.

The outer diameter side slit portion 37c in this embodiment is a through-hole that is in the form of a quasi-triangle whose three corners are rounded to establish peripheries and whose vertex angle is oriented in the radially inward direction. A radially inward direction of the outer diameter side slit portion 37c is, as shown in FIG. 3C with chain line, a portion that is in fluid communication with a radially outward end portion of the intermediate slit portion 37b of the second slit 37. On the other hand, the outer diameter side slit portion 37c in the radially outward direction, as depicted in one-dotted lines in FIG. 3C, is a portion that is in fluid communication with the first slit 40 constituting the first flow passage 34.

The first slit 40 that constitutes the first flow passage 34 is set to be larger in circumferential width than the second slit 37. Thus, the outer diameter side slit portion 37c that serves for connecting the intermediate slit portion 37b of the second slit 37 to the first slit 40 is shaped to spread in a fan shape in the radially outward direction.

In the above-described second slit 37 that constitutes the second flow passage 36, the inner diameter side slit portion 37a extends from the shaft hole 30 in the radial direction into the intermediate slit portion 37b after bifurcation, and the intermediate slit portion 37b extends further in the radially outward direction. Then, the intermediate slit portion 37b is in fluid communication with the outer diameter side slit portion 37c located at the axially outward side, and extends further in the radially outward direction to be in fluid communication with the first slit 40 that constitutes the first flow passage 34.

In such a structure, it is desired that the second flow passage 36 is of a radially symmetrical shape in the axially central portion B of the rotor core 24. This provides an advantage of excellent rotational balance of the rotor 14. Due to the similar reason, it is desirable that the first flow passage 34 and the second flow passage 36 are formed so as to be rotationally symmetrically positioned with respect to the rotation center axis X of the rotor core 24.

In FIG. 2, the flow of the cooling oil is depicted with bald arrow lines. The cooling oil passing through the coolant flow passage 26 inside the shaft 22 is caused, by centrifugal force during rotation of the rotor, to be discharged from the coolant supply port 28 to the rotor core 24, thereby being introduced into the second slit 37.

The cooling oil introduced into the second slit 37 flows through each of the portions 37a, 37b, and 37c of the second slit 37 that are in stepwise fluid communication in the radially outward direction and flows into the first flow passage 34 that is constituted by the first slit 40.

The cooling oil entered into the first flow passage 34 flows in the axial direction. Thereby, the cooling oil that is being in contact with a wall surface of the first flow passage 34 in the radially outward direction, while the Cooling oil the cooling oil passes through the first flow passage 34, cools down the magnet sets 32 through the electromagnetic steel plates that constitute the rotor core 24.

In such a way, the cooling oil whose temperature is raised by receiving heat from the rotor core 24 is discharged from the end portion of the first flow passage 34 that opens at axial end surfaces of the rotor core 24 and is scattered in the radially outward direction with centrifugal force. It is to be noted that the resulting cooling oil is collected with a decrease in temperature by a cooling oil circulating system (not shown) that includes, for example, a heat radiator and pump and is fed into the coolant flow passage 26 inside the shaft 22 for circulation.

Figure 4A:
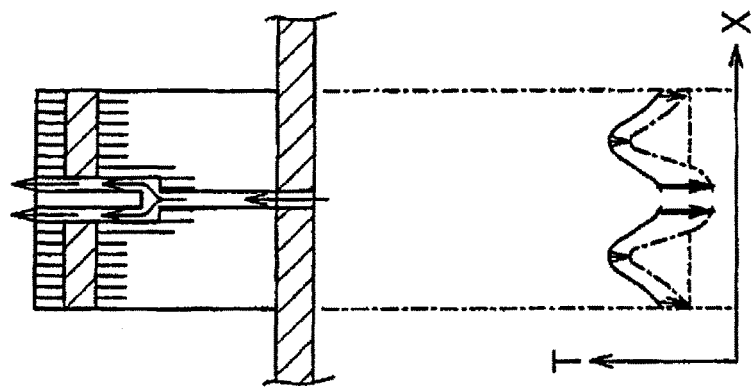
FIG. 4A is a schematically illustrated view of a magnet cooling effect in a rotor according to an embodiment of the present invention.
Figure 4B:
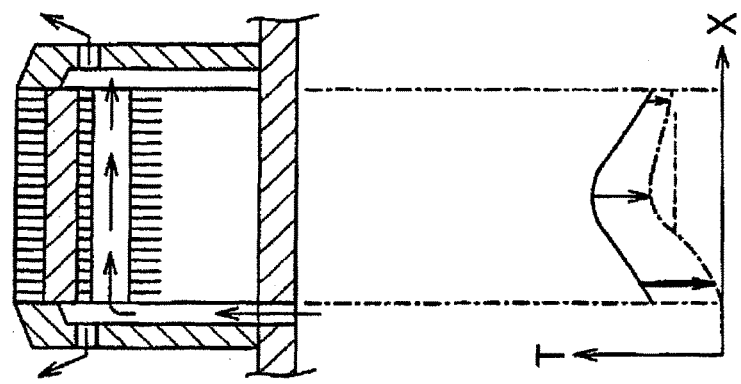
FIG. 4B is a schematically illustrated view of a magnet cooling effect in a first comparative example.
Figure 4C:
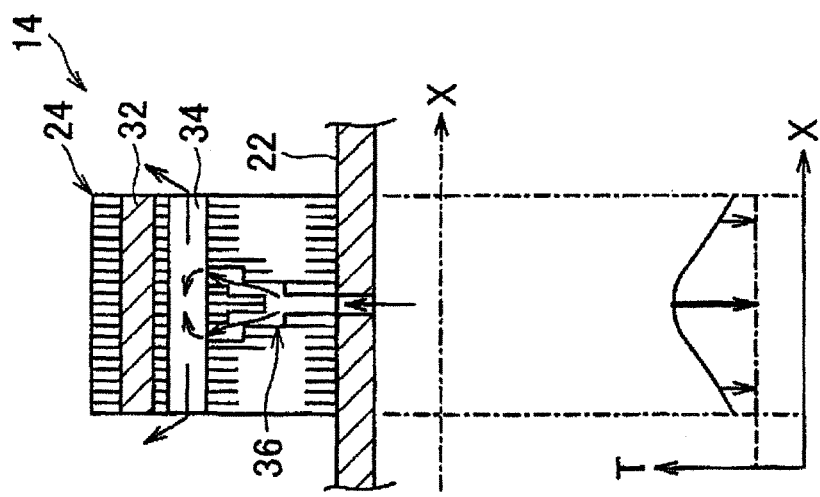
FIG. 4C is a schematically illustrated view of a magnet cooling effect in a second comparative example.

FIG. 4A is a schematically illustrated view of a magnet cooling effect in the rotor 14 according to this embodiment, and FIGS. 4B and 4C illustrate schematically a magnet cooling effect in two comparative examples. In each of FIGS. 4A-4C, the upper side portion illustrates a schematic diagram of the rotor cooling structure, while the lower side portion depicts a graph that schematically plots the relationship between the axial position of magnet and the temperature. In each graph, the horizontal axis denotes the axial position of magnet, while the vertical axis denotes the temperature of magnet. In addition, the magnet temperature distribution before cooling, the magnet temperature distribution after cooling, and the cooling target temperature are depicted with solid lines, one-dotted lines, and broken lines, respectively.

The first comparative example shown in FIG. 4B indicates a rotor having a cooling structure in which a cooling oil supplied from a shaft to one end side of a rotor core flows to the axially other end side through a coolant flow passage near a magnet. In this structure, regarding the magnet whose maximum temperature appears at its axially intermediate region, the cooling effect at the one end side of the magnet to which the fresh, low temperature cooling oil is supplied is high, while the axially intermediate region of the magnet that is required to be cooled most in the magnet cannot achieve the desired cooling target temperature due to the decreased cooling effect caused by the increased temperature of the cooling oil, and uniform cooling of the magnet along its axial direction cannot be attained.

In the second comparative example shown in FIG. 4C, a cooling oil that is supplied from a shaft to an axially intermediate position of a rotor core flows through the rotor core in the radially outward direction, comes to be bifurcated, and thereafter further flows in the radially outward direction, resulting in that the cooling oil is discharged from an outer periphery of the rotor core. In this configuration, when the fresh, low temperature cooling oil is used to cool down an axially intermediate region of the magnet, the temperature is comparatively largely lowered, while other portions of the rotor core cannot be cooled down to a desired cooling target temperature due to the degradation of the cooling effect caused by the temperature-increased cooling oil. In addition, uniform cooling of the magnet along its axial direction cannot be attained. Furthermore, if the cooling oil enters into between the rotor and stator, a drag loss generates during rotation of the rotor.

On the contrary, as shown in FIG. 4A, according to the rotor 14 of this embodiment, the lower-temperature cooling oil cools down the axially intermediate region of the magnet that becomes high temperature to the desired cooling target temperature and thereafter the cooling oil that flows therefrom in the axially outward direction can cool down uniformly the entire magnet set 32 that terminates in its axial end portion to the desired cooling target temperature. Thus, such a uniform cooling of the entire magnet set 32 makes it possible to suppress an amount of a rare earth element such as (for example) dysprosium (Dy) or terbium (Tb) that is added for enhancing demagnetizing resistance, thereby reducing the production cost of the magnet.

In addition, in the rotor 14 of the present embodiment, the second slit 37 that constitutes the second flow passage 36 is formed by combing the electromagnetic steel plates 25b each of which has the inner diameter side slit portion 37a, the electromagnetic steel plates 25c each of which has the intermediate slit portion 37b, and the electromagnetic steel plates 25d each of which has the outer diameter side slit portion 37c. The formation positions of the slit portion 37a, 37b, and 37c in the respective electromagnetic steel plates 25b, 25c, and 25d are different from one another, which make it to suppress the stress caused by the centrifugal force during rotation of the rotor by distributing the stress to each of the electromagnetic steel plates 25b, 25c, and 25d. Thus, decreasing the strength of each of the electromagnetic steel plates 25b, 25c, and 25d forming the second slit 37, that is, decreasing the strength of the rotor core 24 can be suppressed.

Furthermore, inside the rotor core 24, the first slit 40 that constitutes the first flow passage 34 is set to be larger in circumferential width than the inner diameter side slit portion 37a of the second slit 37 that constitutes the second flow passage 36 and the intermediate slit portion 37b. Thereby, the contact area of the first flow passage 34 formed near the magnet set 32 with the cooling oil is allowed to increase, which makes it possible to improve the magnet cooling performance by the cooling oil passing through the first flow passage 34.

Figure 5:
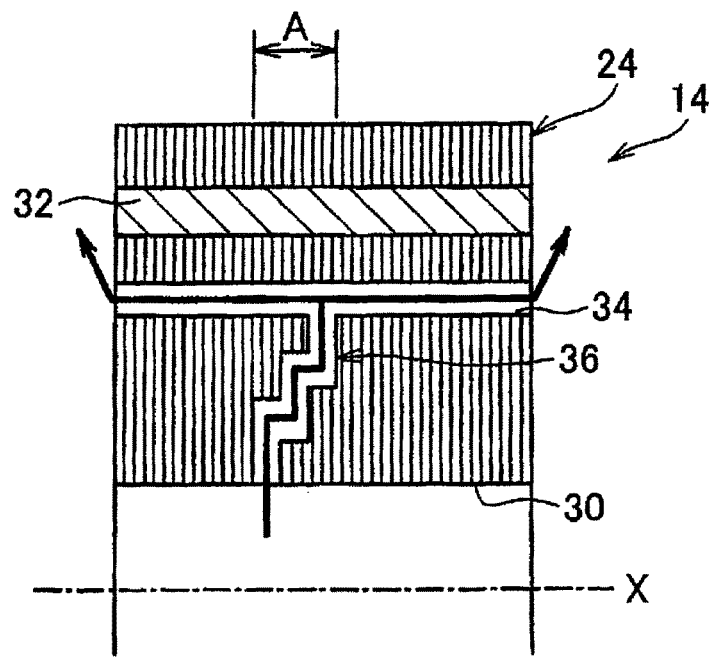
FIG. 5 is a view, corresponding to FIG. 2, which illustrates a modification of a second flow passage formed in the rotor core.

FIG. 5 is a view, corresponding to FIG. 2, which illustrates a modification of a second flow passage 36 formed in the rotor core 24. In this modification, instead of the bifurcated structure, the second flow passage 36 extends in stepwise manner from the shaft hole 30 formed in the radial central portion of the rotor core 24 to the first flow passage 34 and joins to the first flow passage 34 in the axially intermediate region A of the rotor core 24. More specifically, the second flow passage 36 of this modification is formed in such a manner that a set of the plural electromagnetic steel plates 25c each of which is formed with the intermediate slit portion 37b is positioned to adjoin the axially one end side of a set of plural electromagnetic steel plates 25b each of which is formed with the inner diameter side slit portion 37a, and further a set of the plural electromagnetic steel plates 25d each of which is formed with the outer diameter side slit portion 37c is positioned to adjoin an axially one end side of the set of the plural electromagnetic steel plates 25c. This modification also is capable of cooling a high temperature portion of the magnet by supplying the cooling oil at a lower temperature, while suppressing the decrease in the strength of the electromagnetic steel plates due to the formation of the second slit 37.

Figure 6:
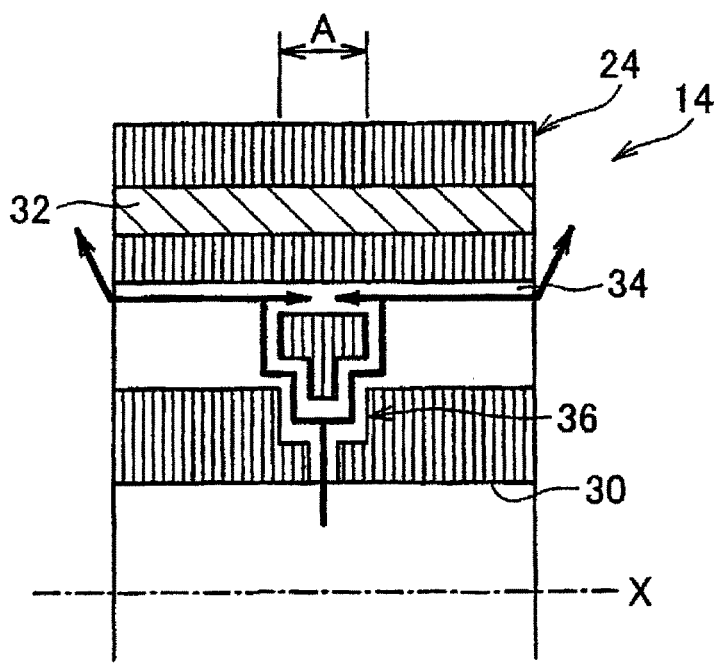
FIG. 6 is a view, corresponding to FIG. 2, which illustrates anther modification of the second flow passage formed in the rotor core.

FIG. 6 is a view, corresponding to FIG. 2, which illustrate an alternative modification of a second flow passage 36 formed in the rotor core 24. In the alternative modification, a first flow passage 34, which is defined as a hole whose shape is identical with the outer diameter side slit portion 37c of the second slit 37, extends to both axial ends of the rotor. More specifically, in this alternative modification, the second flow passage 36 is formed in such a manner that a set of the plural electromagnetic steel plates 25c each of which is formed with the intermediate slit portion 37b is positioned to adjoin each axial end of a set of the plural electromagnetic steel plates 25b each of which is formed with the inner diameter side slit portion 37a and a set of plural electromagnetic steel plates 25d each of which is formed with the outer diameter side slit portion 37c is positioned to adjoin each axial end of the set of the plural electromagnetic steel plates 25c. The alternative modification is also capable of cooling a high temperature portion of the magnet by supplying the cooling oil whose temperature is set to be lower, while suppressing the decrease in the strength of the electromagnetic steel plates due to the formation of the second slit 37. In addition, the first flow passage 34, which is defined as a hole whose shape is identical with the outer diameter side slit portion 37c of the second slit 37, extends to both the axial ends of the rotor, which expands the first flow passage 34, thereby enabling the rotor core 24 to reduce its weight.

It is to be noted that the present invention should not be limited to the aforementioned embodiment and its modifications and is susceptible of various changes and improvements without departing from the scope of the claimed invention and its equivalency.

For example, in the foregoing description, regarding the second slit 37, the radial-direction length of the inner diameter side slit portion 37a is set to be shorter than the radial-direction length of the intermediate slit portion 37b, which is not a limited configuration. Contrary to this, the inner diameter side slit portion 37a may be set to be longer than or equal to the intermediate slit portion 37b.

In addition, according to the foregoing description, the position of the first flow passage 34 is explained to correspond to between the magnetic poles of the rotor core 24, which is not a limited configuration, and formation of each of the first flow passage 34 and the second flow passage 36 may be positioned by corresponding to the radially inner diameter side of each the magnetic pole.

Furthermore, the first flow passage 34 may have a function of flux barrier that define a passage through which magnetic flux passes in the rotor core 24.

The invention claimed is:

1. A rotor for a rotary electric machine, the rotor comprising:
   a rotor core;
   a shaft having therein a coolant flow passage and a coolant supply port, the coolant flow passage being configured to allow a coolant to flow, and the coolant supply port being configured to supply the coolant to the rotor core; and
   a magnet provided in the rotor core, the magnet extending along an axial direction of the rotor core,
   wherein the rotor core is fixedly mounted on the shaft, the rotor core is formed by laminating steel plates, the rotor core has a coolant flow path through which the coolant flows,
   the coolant flow path includes a first flow passage and a second flow passage,
   the first flow passage extends along the axial direction near the magnet,
   the second flow passage connects the coolant supply port of the shaft and the first flow passage,
   the first flow passage is formed to penetrate the rotor core by overlapping first slits formed in all of the respective steel plates that constitutes the rotor core,
   the second flow passage is formed by overlapping second slits formed in the steel plates that constitute an axially intermediate region of the rotor core,
   the second slits are different in position that are formed in the respective steel plates
   the first flow passage and the second flow passage join at the axially intermediate region of the rotor core,
   the second flow passage is bifurcated toward the first flow passage, and
   the second flow passage has a radially symmetrical shape.

2. The rotor according to claim 1, wherein
   a circumferential width of the first flow passage is set to be larger than a circumferential width of the second flow passage,
   the steel plate has a junction at which the first flow passage and the second flow passage join, and
   the second slit is spread in a radially outward direction and connects with the first slit that constitutes the first flow passage.

3. The rotor according to claim 1, wherein
   the second slit has an inner diameter side slit portion and an intermediate slit portion,
   the inner diameter side slit portion is set shorter than the intermediate slit portion,
   the inner diameter side slit portion has one radial end and the other radial end, the one radial end is opened to a shaft hole of the rotor core and the other radial end is closed, and
   both radial ends of the intermediate slit portion are closed.

4. A rotary electric machine, comprising:
   a rotor including:
      a rotor core;
      a shaft having therein a coolant flow passage and a coolant supply port, the coolant flow passage being configured to allow a coolant to flow, and the coolant supply port being configured to supply the coolant to the rotor core; and
      a magnet provided in the rotor core, the magnet extending along an axial direction of the rotor core; and
   a stator faced to the rotor with a gap,
   wherein the rotor core is fixedly mounted on the shaft, the rotor core is formed by laminating steel plates, the rotor core has a coolant flow path through which the coolant flows,
   the coolant flow path includes a first flow passage and a second flow passage,
   the first flow passage extends along the axial direction near the magnet,
   the second flow passage connects the coolant supply port of the shaft and the first flow passage,
   the first flow passage is formed to penetrate the rotor core by overlapping first slits formed in all of the respective steel plates that constitutes the rotor core,
   the second flow passage is formed by overlapping second slits formed in the steel plates that constitute an axially intermediate region of the rotor core,
   the second slits are different in position that are formed in the respective steel plates
   the first flow passage and the second flow passage join at the axially intermediate region of the rotor core,
   the second flow passage is bifurcated toward the first flow passage, and the second flow passage has a radially symmetrical shape.

* * * * *